United States Patent [19]

Ho et al.

[11] 4,263,481
[45] Apr. 21, 1981

[54] AUTOMATIC TELEPHONE ANSWERING AND RECORDING APPARATUS

[75] Inventors: Charles W. Ho, Lafayette, Calif.; Tohru Takahashi, Tokyo, Japan

[73] Assignees: Dictran International Corp., South San Francisco, Calif.; Victor Company of Japan, Ltd., Yokohama, Japan

[21] Appl. No.: 958,727

[22] Filed: Nov. 8, 1978

[30] Foreign Application Priority Data

Nov. 10, 1977 [JP] Japan .............................. 52-135180

[51] Int. Cl.³ .......................................... H04M 1/64
[52] U.S. Cl. ................... 179/6.14; 179/6.16; 179/84 R; 369/50
[58] Field of Search .................. 179/6 R, 6 C, 84 R, 179/2 A, 100.1 VC, 1 VC

[56] References Cited

U.S. PATENT DOCUMENTS

| | | | |
|---|---|---|---|
| 3,702,904 | 11/1972 | Bard | 179/84 R |
| 3,864,520 | 2/1975 | Owen | 179/100.1 VC |
| 3,941,934 | 3/1976 | Bonsky | 179/100.1 VC |
| 3,979,560 | 9/1976 | Darwood | 179/6 R |
| 4,049,916 | 9/1977 | Danner | 179/6 E |

Primary Examiner—Bernard Konick
Assistant Examiner—Alan Faber
Attorney, Agent, or Firm—Owen, Wickersham & Erickson

[57] ABSTRACT

An automatic telephone answering and recording apparatus comprises a first cassette tape on which a specific answering message content has previously been recorded, a circuit operating in response to call signals sent by a caller to close the speaking circuit of an associated telephone set and to carry out telephone line connection, an answering circuit for reproducing said answering message content through the telephone line to the caller, a second cassette tape which is still unrecorded, and incoming message recording circuit for recording on the second cassette tape an incoming message content sent through the telephone line from the caller. The telephone line connection circuit operating to carry out the line connection in response to a first specific number of call signals from the caller after a recording of an incoming message has been carried out and in response to a second specific number of call signals differing from the first specific number of call signals in the case where there has been no recording of an incoming message.

5 Claims, 2 Drawing Figures

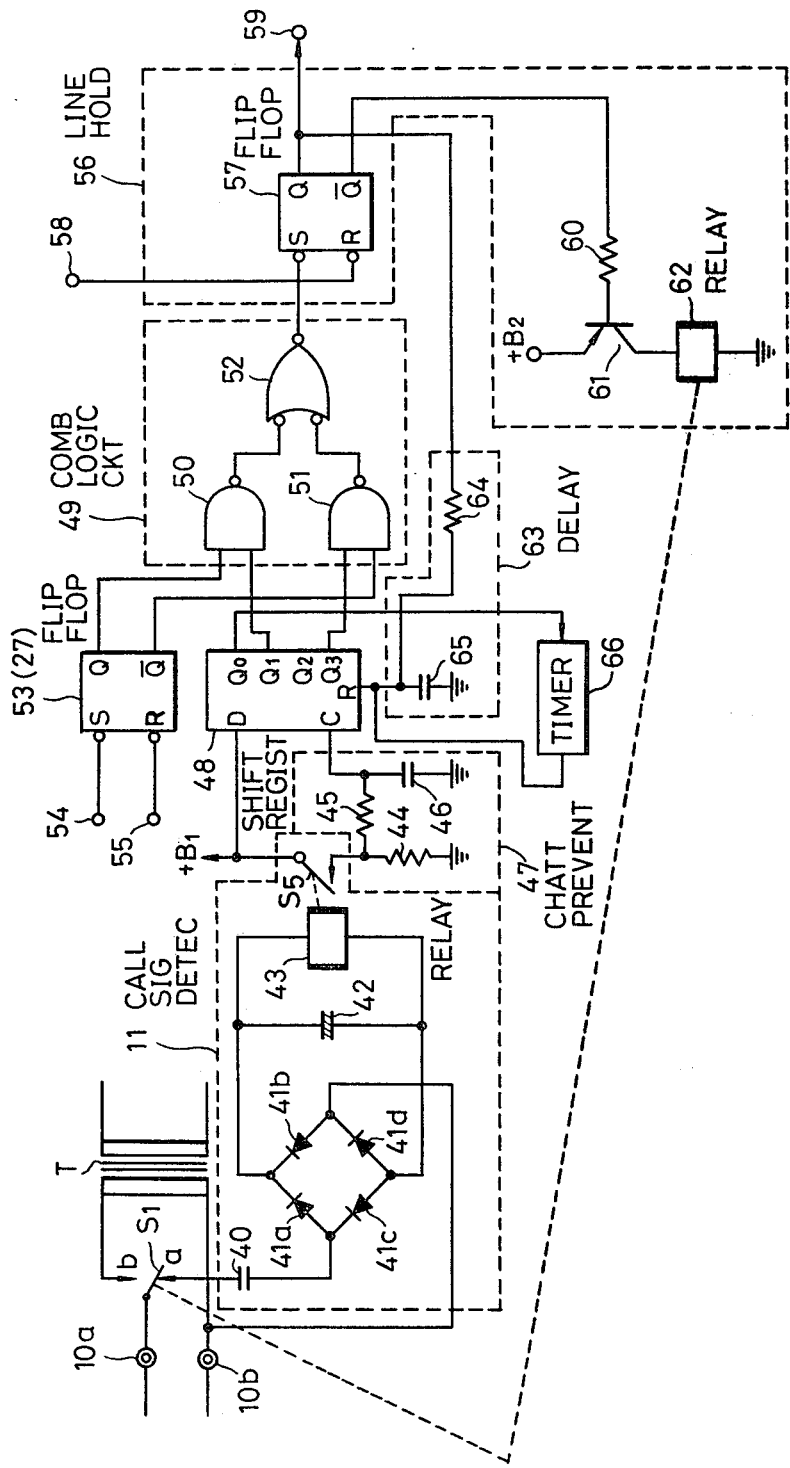

AUTOMATIC TELEPHONE ANSWERING AND RECORDING APPARATUS

BACKGROUND OF THE INVENTION

The present invention relates generally to automatic telephone answering and recording apparatuses of the type which automatically answers incoming calls and thereafter records the voice of the calling party. More particularly, the invention relates to an automatic telephone answering and recording apparatus in a system of the type wherein the owner of the automatic telephone answering and recording apparatus can determine easily, from an outside place away from this apparatus, whether or not there has been any recording of a caller's message or incoming message during his absence.

In general, an automatic telephone answering and recording apparatus comprises answering means which operates to close automatically the speaking circuit of the corresponding telephone in response to an incoming call in the case where the called party is not present, to reproduce an answering message recorded before-hand on a first cassette tape, and to send out the outgoing answering message toward the calling party through the telephone line and incoming caller's message recording means which operates to record on a second cassette tape any message or announcement sent from the calling party through the telephone line.

For the owner of this automatic telephone answering and recording apparatus to determine, from an outside place away from this apparatus, whether or not there has been any recording of a caller's message or incoming message during his absence, the following manipulative procedure has been necessary with a known apparatus. First, from the outside place, the owner calls the telephone which he owns by dialing its call number. Then, after the telephone line has been connected, he sends a predetermined control signal through the line thereby to rewind and reproduce the above mentioned second cassette tape. Then, when an incoming message has been recorded on the second cassette, it is reproduced, and the owner can hear through the line the content of the recorded incoming message.

In the case of this conventional apparatus, however, even when an incoming message has not been recorded on the cassette tape, the apparatus is activated by the above mentioned control signal to rewind and thereafter to reproduce the cassette tape. The owner thus listens for a reproduced sound and, upon learning that there is no reproduced sound, discovers for the first time that there has not been any recording of an incoming message. Consequently, in the case where there has been no recording of any incoming message, the above described manipulative procedure and operation become completely wasted. Correlatively, the time expended from the start of the manipulative procedure to the discovery that there has been no recording of an incoming message and the resulting telephone charge are completely wasted.

SUMMARY OF THE INVENTION

Accordingly, it is a general object of the present invention to provide a novel and useful automatic telephone answering and recording apparatus in which the above described problem has been solved.

Another and specific object of the invention is to provide an automatic telephone answering and recording apparatus of an organization such that, in the case where there is already a recording of an incoming message, the line is connected with a small first specific number of cyclic repetitions of call signals, while in the case where there is no recording incoming message, the line is connected with a large second specific number of repetitions of call signals.

By the use of the apparatus of the present invention, the owner of the apparatus sends the above mentioned first specific number of repetitions of call signals from the outside place, and, if the line is not connected, he immediately knows that there has been no recording of an incoming message. Accordingly, there is no necessity of reproducing the tape for recording incoming messages by connecting the line as was necessary heretofore, whereby the existence or nonexistence of a recording of an incoming message can be determined in a very short time. Furthermore, by replacing the telephone receiver on its cradle to terminate the call within the interval from the time the call signal has been sent the above mentioned first specific number of repetitions to the time when second specific number of repetitions of the call signal are sent, the nonexistence of any recorded incoming calls can be determined without the necessity of paying any telephone charge.

Other objects and further features of the invention will be apparent from the following detailed description when read in conjunction with the accompanying drawings.

BRIEF DESCRIPTION OF THE DRAWINGS

In the drawings:

FIG. 2 is a circuit diagram showing one example of a specific circuit in concrete form of an essential part of the apparatus shown in block form in FIG. 1.

DETAILED DESCRIPTION

Figure 1:
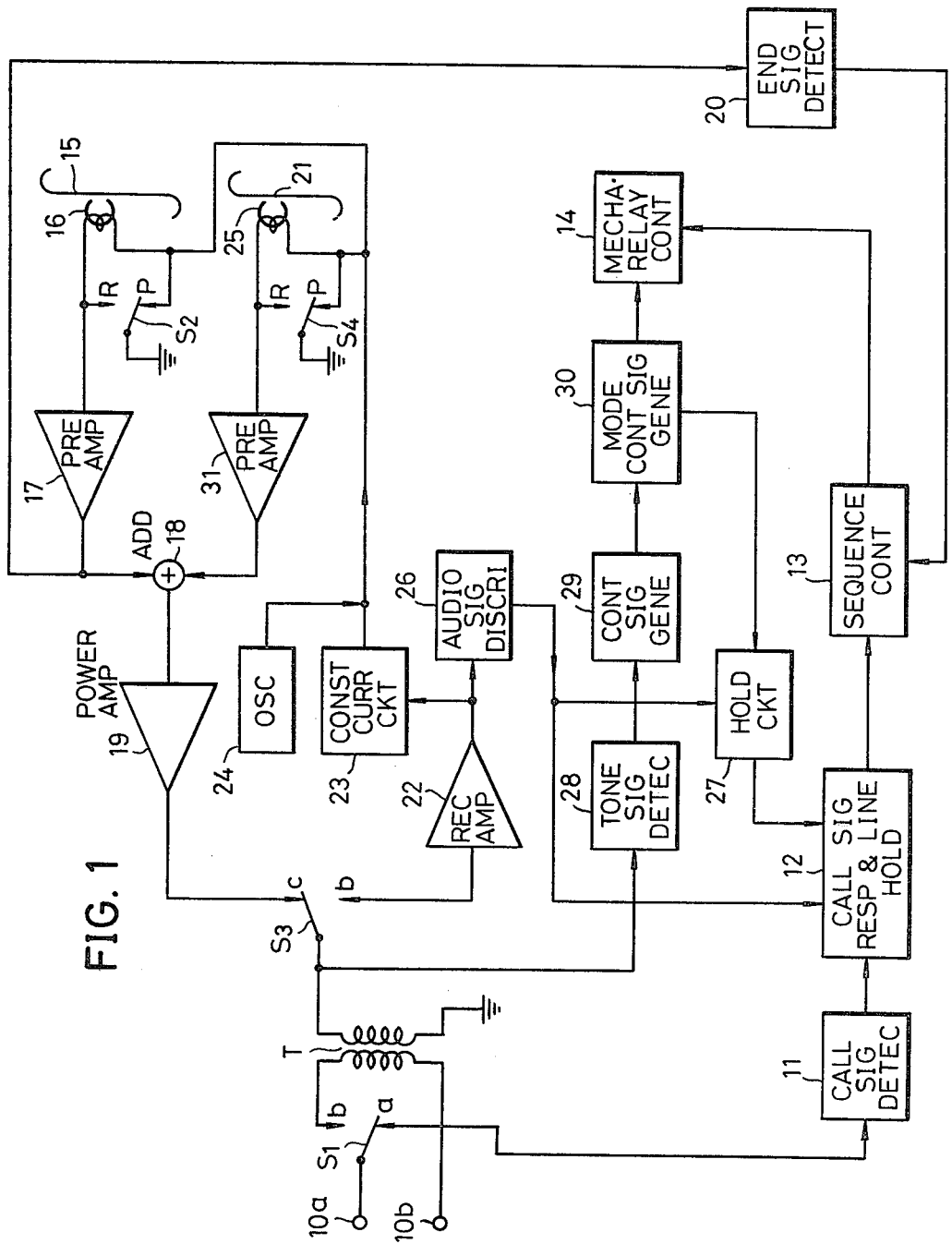
FIG. 1 is a block diagram of one embodiment of the automatic telephone answering and recording apparatus according to the invention.

Referring first to FIG. 1, the general features of the apparatus of the present invention will be described. When a call signal arrives between terminals 10a and 10b for connecting the apparatus to the line, the call signal passes through a relay switch S1, whose moving contact is normally in contact with its contact point a, and is supplied to a call signal detection circuit 11, where the call signal is detected. The call signal thus detected is supplied to a circuit 12 for responding to the call signal and holding the line. As it counts the first and second specific numbers of repetitions of the call signal, as described hereinafter, this circuit 12 changes the connection of the switch S1 to its contact point b and carries out connection to the line.

The output signal of the circuit 12 at this time is supplied through a sequence control circuit 13 to a mechanism relay control circuit 14 thereby to place the tape driving system mechanism on the answering side in operative state. A tape 15 of a first cassette, on which tape an answering message has been previously recorded, is thereby driven. A switch S2 is switched beforehand to its contact point P, and, for this reason, the answering message is reproduced from the tape 15 by a head 16. The signal thus reproduced is sent out to the telephone line through a reproducing pre-amplifier 17, an adder 18, a power amplifier 19, a switch S3 connected to its normally closed contact point c, a transformer T, and the switch S1 connected to its contact point b as mentioned above. As a result, the telephone caller learns that the owner of the called telephone is absent and hears the content of the answering message including a request for the caller to state his business (i.e., incoming message) after the reproduction of the answering message has finished.

Upon completion of the reproduction of the answering call, an end signal recorded on the tape at that completion position is reproduced and detected by an end signal detection circuit 20. This detected signal is fed by way of the sequence control circuit 13 to the mechanism relay control circuit 14, whereby the travel of the tape 15 is stopped. At the same time, the switch S3 is switched over to its contact point d, and a switch S4 is switched over to its contact point R. Also simultaneously, the tape driving system mechanism on the incoming message recording side is placed in its operative state, and the tape 21 of a second cassette is driven.

The audio signal of the incoming message expressed by the caller is transmitted through the telephone line and is fed by way of the terminals 10a and 10b, the switch S1, the transformer T, and the switch S3, to a recording amplifier 22. The resulting output signal of the recording amplifier 22 is passed through a constant-current circuit 23 and, after an AC bias signal of a specific frequency from an oscillator 24 has been applied thereto, is recorded by a head 25 on the tape 21. On the other hand, the output signal of the recording amplifier 22 is fed to an audio signal discrimination circuit 26, where it is subjected to discrimination as to the existence or nonexistence therein of an audio signal. While the caller is stating his business (i.e., incoming message), the existence of an audio signal is discriminated, and a signal is sent to a hold circuit 27 to hold the same in a set state. Accordingly, the circuit 12 for call signal responding and line holding operates in response to the resulting signal from the hold circuit 27 to cause the state of connection of the switch S1 to its contact point b to be held as it is.

When the caller has finished stating his incoming message, the audio signal discrimination circuit 26 discriminates the nonexistence of the audio signal and accordingly produces a corresponding discrimination signal which resets the circuit 12. As a result, the switch S1 is switched over to its contact point a. Furthermore, in concert with the resetting of the circuit 12, the switches S3 and S4 are caused via the control circuits 13 and 14 to be respectively switched over to their contact points c and P. As a result, the automatic telephone answering and recording apparatus assumes its standby state.

Next, the case where, after there has been a recording of an incoming message as described above, the owner of the apparatus who is away therefrom calls his home telephone in order to determine whether or not there has been a recording of an incoming message during his absence and, if so, to learn the content of the incoming message will be considered. Similarly as in the above described case, the call signal passes through the switch S1 and the call signal detection circuit 11 and is supplied to the circuit 12. This circuit 12 is so adapted as described hereinafter that, when recording of an incoming message is carried out, it operates in response to a first specific number (two in the present embodiment) of repetitions of call signals to change over the switch S1 to its contact point b and to carry out holding of the line.

From the fact that the line has been connected upon his sending two repetitions of the call signal, the owner of the apparatus, who has thus sent the call, knows that there has been a recording of an incoming message. Accordingly, by pushing specific dial number buttons of a touch-tone telephone set (for example, a specific combination of number buttons of three digits), the owner causes a specific tone signal to be generated and sent as a control signal. In the case where there is no touch-tone telephone set, a generator for producing a specific tone may be used. This specific tone signal is detected by a tone signal detection circuit 28, and the resulting detection signal thereof is fed via a control signal generating circuit 29 to a mode control signal generating circuit 30. The output mode control signal from the circuit 30 is supplied to the mechanism relay control circuit 14, whereupon the tape driving system mechanism on the incoming message recording side is thereby controlled by this control circuit 14 and causes full rewind operation of the tape 21 of the second cassette to be carried out. When this full rewind operation is completed, the tape driving system mechanism on the incoming message recording side causes the tape 21 to travel in the play direction, and the content of the incoming message recorded on this tape 21 is reproduced by the head 25. The signal thus reproduced is sent out into the telephone line via a pre-amplifier 31, the adder 18, the power amplifier 19, the switch S3, the transformer T, and the switch S1, and the owner who has made the call is able to hear the content of the recorded incoming message.

On the other hand, when the owner's telephone is called with the apparatus in the state wherein there has been no recording of an incoming message, the circuit 12 for call signal answering and line holding does not answer with respect to the first specific number of call signal repetitions and answers with respect to the greater second specific number (four in the present embodiment) of call signal repetitions, as described hereinafter. Accordingly, the owner of the apparatus who has made the call from the outside telephone notes that the line has not been connected with two repetitions of the call signal and therefore knows immediately at that instant that there has been no recording of an incoming message. Therefore, the existence or nonexistence of an incoming message recording can be determined in much shorter time in comparison with the case wherein the fact that there has been no recording of an incoming message is known for the first time upon reproducing the tape for recording incoming messages, as has been the case heretofore. In the case of the apparatus of the invention, if the telephone receiver being used by the caller (the owner in this instance) is replaced on its cradle between the transmission of the second call signal and that of the subsequent fourth call signal, the line will not be connected, and therefore there will be no telephone charge.

An essential part of the apparatus of the invention will now be described in detail with reference to FIG. 2.

A call signal which has arrived at the terminals 10a and 10b is passed by the switch S1 switched to its contact point a and is thus fed to the call signal detection circuit 11. In this detection circuit 11, the AC component of the call signal is extracted by a DC blocking capacitor 40 and undergoes full-wave rectification in a bridge-type rectification circuit comprising diodes 41a through 41d. The resulting signal is smoothed by a capacitor 42 and supplied to a relay 43 to operate the same. As a consequence, a relay switch S5 of the relay 43 is closed every time a call signal arrives.

With each closure of the switch S5, the power source voltage $+B_1$ is applied by way of a chattering prevention circuit 47 comprising resistors 44 and 45 and a capacitor 46 to the clock input terminal C of a shift register 48 of series-connected input and parallelly-connected output type constituting a counter. The above mentioned power source voltage $+B_1$ is being applied to the data input terminal D of the shift register 48. When the shift register 48 is in its reset state, its outputs Q0, Q1, Q2, and Q3 are all at their low (L) levels.

When a first call signal is detected in the detection circuit 11, a first signal is applied to the clock input terminal C of the shift register 48, and only the output Q0 becomes of high (H) level from the low level. The second call signal causes a second signal to be applied to the clock terminal C, whereupon the output Q0 remains at its high level, and the output Q1 becomes of high level from the low level. Similarly thereafter, upon arrival of the third call signal, the outputs Q0 and Q1 of the shift register 48 remain at their high levels, and the output Q2 becomes of high level from the low level, and upon arrival of the fourth call signal, all outputs Q0 through Q3 become of high level.

The output Q1 terminal and Q3 terminal of the shift register 48 are respectively connected to one each of the input terminals of two-input NAND gates 50 and 51 of a combined logic circuit 49. The aforementioned hold circuit 27 comprises, for example, an RS flip-flop circuit 53, whose Q output terminal and $\overline{Q}$ output terminal are respectively connected to the other input terminals of the NAND gates 50 and 51. The output terminals of NAND gates 50 and 51 are connected respectively to the input terminals of an AND gate 52.

When the above mentioned recording of an incoming message has been carried out, the discrimination signal from the audio signal discrimination circuit 26 is applied through a terminal 54 to the set input terminal S of the flip-clop circuit 53, which is thereby placed in its set state. Accordingly, in the case where an incoming message has been recorded, the Q output from the flip-flop circuit 53 is reset state is being applied to the NAND gate 50. Therefore, when a call arives after an incoming message has been recorded, the arrival of the second call signal causes the output Q1 of the shift register 48 to become of high level and to be supplied to the NAND gate 50, whereupon the resulting output of the NAND gate 50 is applied by way of the AND gate 52 to the set input terminal S of an RS flip-flop circuit 57 of a line hold circuit 56, whereupon the flip-flop circuit 57 is placed in its set state.

When the flip-flop circuit 57 is thus set, its Q output is supplied through a terminal 59 to the sequence control circuit 13. At the same time, its Q output is applied by way of a delay circuit 63 comprising a resistor 64 and a capacitor 65 to the reset terminal of the shift register 48 thereby to reset the same and cause all outputs Q0 through Q3 to become of low level. Furthermore, the $\overline{Q}$ output of the flip-flop circuit 57 becomes of low level, and a PNP transistor 61, whose base is connected by way of a resistor 60 to the $\overline{Q}$ output terminal of the flip-flop circuit 57, assumes its "ON" state. As a result of this "ON" state of the transistor 61, current is passed through a relay 62, and the switch S1 is switched over from its contact point a to its contact point b. The above mentioned chattering prevention circuit 47, shift register 48, combined logic circuit 49, and line hold circuit 56 constitute the above-mentioned circuit 12.

Thus, when a call is made after there has been an instance of recording of an incoming message, the line is connected by two transmissions of the call signal. Therefore, the owner of the apparatus transmits a control signal as described hereinbefore thereby to rewind the incoming message recording tape and reproduce the same and listens to the content of the incoming message.

The operation of the apparatus of the invention in the case where there has been no recording of an incoming message will now be described. When the owner of the apparatus is going out, the apparatus is set in its standby state by pressing a ready button, whereupon a reset signal is applied through a terminal 55 to the reset terminal R of the flip-flop circuit 53, which is thereby placed in its reset state. As a consequence, the $\overline{Q}$ output of the flip-flop circuit 53 is applied to the NAND gate 51. As long as there is no recording of an incoming message, the flip-flop circuit 53 remains in its reset state.

Then, when call signals arrive at the terminals 10a and 10b, a signal is applied to the clock input terminal C of the shift register 48 every time a call signal arrives, similarly as described above, and the outputs Q0, Q1, . . . successively become of high level. Upon counting of the second call signal, the output Q1 becomes of high level, but since the Q output is not being applied from the flip-flop circuit 53 to the NAND gate 50, no output is produced from this NAND gate. When the fourth call signal arrives, the Q3 output of the shift register 48 becomes of high level. Accordingly, the output of the NAND gate 51 is supplied by way of the AND gate 52 to the set terminal S of the flip-flop circuit 57. As a result, the relay 62 operates, similarly as described above, and the switch S1 is changed over to its contact point b, whereupon the line is connected.

At the same time, the mechanism relay control circuit 14 is operated by a signal sent through the terminal 59 as described above, and reproduction of the tape on the answering side is carried out, the tape on the incoming message side then being placed in its recording state. Then, in the case where the person sending the call signals wishes to leave an incoming message, he states his message, as described hereinbefore, and thereby records it on the tape on the incoming message side. When he has finished speaking his message, the audio signal discrimination circuit 26 discriminates the fact that the audio signal has vanished and sends a corresponding signal through a terminal 58 to the reset terminal R of the flip-flop circuit 57 thereby to reset this circuit. As a result of this resetting of the flip-flop circuit 57, its $\overline{Q}$ output becomes of high level, and the transistor 60 becomes "OFF". The relay 62 thereby becomes inoperative, and the switch S1 is changed over to its contact point a, whereby the apparatus is disconnected from the telephone line.

In the case wherein the person sending the call signals with the apparatus in the state wherein a recording of an incoming message has not be carried out is the owner of the apparatus, it is possible for him to know that there has been no recording of an incoming message from the fact that, as described hereinbefore, the line is not connected with two call signals. In this case, if the telephone receiver is replaced on its cradle before the fourth call signal is transmitted, there will be no telephone charge since the line has not been connected.

In the case where the call is terminated upon the sending of one call signal after there has been an incoming message recording, or upon the sending of one, two, or three call signals when there has been no incoming message recording, the number of call signals is registered in the shift register, and when there is a subsequent call, the above described general rule concerning the number of call signals will be broken. Accordingly, means are provided to reset the shift register 48 when there is a call, but it is terminated halfway as stated above. More specifically, the Q0 output of the shift register 48 is fed to a timer circuit 66, which produces an output signal after a predetermined time (for example, 40 seconds) to reset the shift register 48. Therefore, even when there is a halfway or unfinished call as described above, the shift register 48 is reset after the predetermined time and is thus restored to its original state, whereby there is no adverse effect on a subsequent operation.

According to the present invention, the owner of the apparatus can call the apparatus from an outside place and, by sending a specific control signal, control the apparatus to record a new answering message on the tape on the answering side. In this case, the switch S3 is switched over to its contact point d, and the switch S2 is switched over to its contact point R. Then, in this case, the flip-flop circuit 53 is set by a signal from the audio signal discrimination circuit 26, but, upon completion of the recording of the new answering message, a signal from a mode control signal generating circuit is applied through the terminal 55 to the reset terminal R of the flip-flop circuit 53, which is thereby reset.

In the above described embodiment of the invention, the apparatus is adapted to answer upon receiving two call signals when there has been an incoming message recording and to answer upon receiving four call signals when there has been no recording of an incoming message. Alternatively, however, the apparatus may be so adapted as to answer upon receiving two call signals when there has been no recording of an incoming message and to answer upon receiving four call signals when there has been a recording of an incoming message. In this case, the Q and $\overline{Q}$ output terminals of the flip-flop 53 are respectively connected to the NAND gates 51 and 50. In this case, the fact that there has been no recording of an incoming message cannot be determined without a telephone call charge, but the line connection is made with a short waiting time in cases such as that wherein it is desired to change the content of the answering message of the tape on the answering side.

Further, this invention is not limited to these embodiments but various variations and modifications may be made without departing from the scope of the invention.

What is claimed is:

1. An automatic telephone answering and recording apparatus comprising:
    a first cassette tape on which a specific answering message content has previously been recorded;
    means operating in response to call signals sent by a caller to close the speaking circuit of an associated telephone set and to carry out telephone line connection;
    answering means for reproducing said answering message content through the telephone line to the caller;
    a second cassette tape which is still unrecorded; and
    incoming message recording means for recording on the second cassette tape an incoming message content sent through the telephone line from the caller, said telephone line connection means comprising a circuit for detecting call signals, means for counting the number of call signals thus detected, means for discriminating the existence or nonexistence of audio signals of an incoming message arriving through the telephone line, holding means, which selectively assumes a reset state and a set state, for memorizing the existence of audio signals by assuming the set state, said existence being discriminated by the discriminating means after the apparatus and the holding means are reset, and means for connecting the telephone line in responsive accordance with the state of the holding means and with the result of the counting of the number of call signals, said telephone line connection means operating to carry out the line connection in response to a first specific number of call signals from the caller when the holding means assumes the set state and in response to a second specific number of call signals differing from the first specific number of call signals when the holding means assumes the reset state.

2. An automatic telephone answering and recording apparatus as claimed in claim 1 in which the telephone line connection means further comprises means for carrying out a logical operation on the counting result of the counting means and on said state held in correspondence to the existence or nonexistence of audio signals and producing a corresponding output, said connecting means connecting the telephone line in response to the output of the logical operation carrying out means and holding the resulting line connected state.

3. An automatic telephone answering and recording apparatus as claimed in claim 2 in which: the counting means comprises a shift register having a plurality of output terminals and producing an output which shifts in responsive accordance with result of counting; and holding means comprises a flip-flop having Q and $\overline{Q}$ output terminals; and the logical operation means has a first gate circuit supplied with the Q output of the flip-flop produced thereby upon being set by a discrimination output due to the existence of an audio signal and with the result of counting of the first specific number by the shift register and a second gate circuit supplied with the $\overline{Q}$ output of the flip-flop produced thereby upon being reset and with the result of counting of the second specific number by the shift register.

4. An automatic telephone answering and recording apparatus as claimed in claim 3 in which the telephone line connection means further has delay means operating to delay the output of the means for connecting the telephone line and holding this connected state and to reset the shift register.

5. An automatic telephone answering and recording apparatus as claimed in claim 3 in which the telephone line connection means further has a timer operated by the output of the shift register to reset the shift register after a specific time from the instant of generation of the output.

* * * * *